United States Patent [19]

Jerard

[11] 4,393,450
[45] Jul. 12, 1983

[54] THREE-DIMENSIONAL MODEL-MAKING SYSTEM

[75] Inventor: Robert B. Jerard, Lebanon, N.H.

[73] Assignee: Trustees of Dartmouth College, Hanover, N.H.

[21] Appl. No.: 177,264

[22] Filed: Aug. 11, 1980

[51] Int. Cl.³ .............................................. G06F 15/46
[52] U.S. Cl. ................................ 364/474; 51/165.71;
83/71; 83/651.1; 125/16 R; 125/18; 125/21;
364/475; 364/191
[58] Field of Search ............... 364/118, 468, 469, 474,
364/475, 520, 512, 191-193; 219/69 W; 83/71,
651.1, 747; 318/39, 571; 125/1, 12, 16 R, 16 L,
16 F, 18, 21, 35; 51/165.71, 165.72

[56] References Cited

U.S. PATENT DOCUMENTS

| | | | |
|---|---|---|---|
| 1,903,518 | 4/1933 | Simmons et al. | 125/21 |
| 2,144,370 | 1/1939 | Gerlach | 125/21 |
| 2,396,852 | 3/1946 | Illmer | 242/54 |
| 2,599,920 | 6/1952 | Jakobsson et al. | 125/21 |
| 2,688,904 | 9/1954 | Richter | 318/39 |
| 2,718,177 | 9/1955 | Karmann | 318/39 |
| 2,771,872 | 11/1956 | Bergling | 125/18 |
| 2,831,476 | 4/1958 | Wilson et al. | 125/12 |
| 2,896,605 | 7/1959 | Thompson | 125/16 |
| 3,153,355 | 10/1964 | Opperthauser et al. | 318/39 |
| 3,155,087 | 11/1964 | Dreyfus | 125/21 |
| 3,208,127 | 9/1965 | Witzig et al. | 29/38 R |
| 3,299,877 | 1/1967 | Grage | 125/21 |
| 3,508,457 | 4/1970 | Ogston | 82/1 |
| 3,525,324 | 8/1970 | Bonnefoy et al. | 125/16 |
| 3,755,701 | 8/1973 | Culver | 310/49 |
| 3,831,576 | 8/1974 | Mech | 125/12 |
| 3,866,052 | 2/1975 | Di Matteo et al. | 250/558 |
| 3,932,923 | 1/1976 | Di Matteo | 29/407 |
| 3,970,361 | 7/1976 | Di Matteo et al. | 350/144 |
| 4,016,856 | 4/1977 | McLaughlin | 125/21 |
| 4,178,670 | 12/1979 | Schmid | 29/417 |
| 4,258,763 | 3/1981 | Figueredo et al. | 125/18 X |

OTHER PUBLICATIONS

Jablonowski—"Sculpting Via Computer Optics'"—American Machinist, Sep. 1979, pp. 79-82.
Laser Technology Inc.—"Cutting With Wire'"—Catalog No. 75-76, North Hollywood, Calif.
Haworth et al.—"Development of Microprocessor Control of a Model-Making Machine"—Computers and Digital Techniques, Aug. 1978, pp. 75-78.

*Primary Examiner*—Joseph F. Ruggiero
*Attorney, Agent, or Firm*—Robert Shaw

[57] ABSTRACT

A three-dimensional model-making system that employs a cutting wire under tension and acting in a reciprocating mode to shape an easily-machinable material. The machine has three servo-driven axes including an x and y axis and a rotational axis.

29 Claims, 10 Drawing Figures

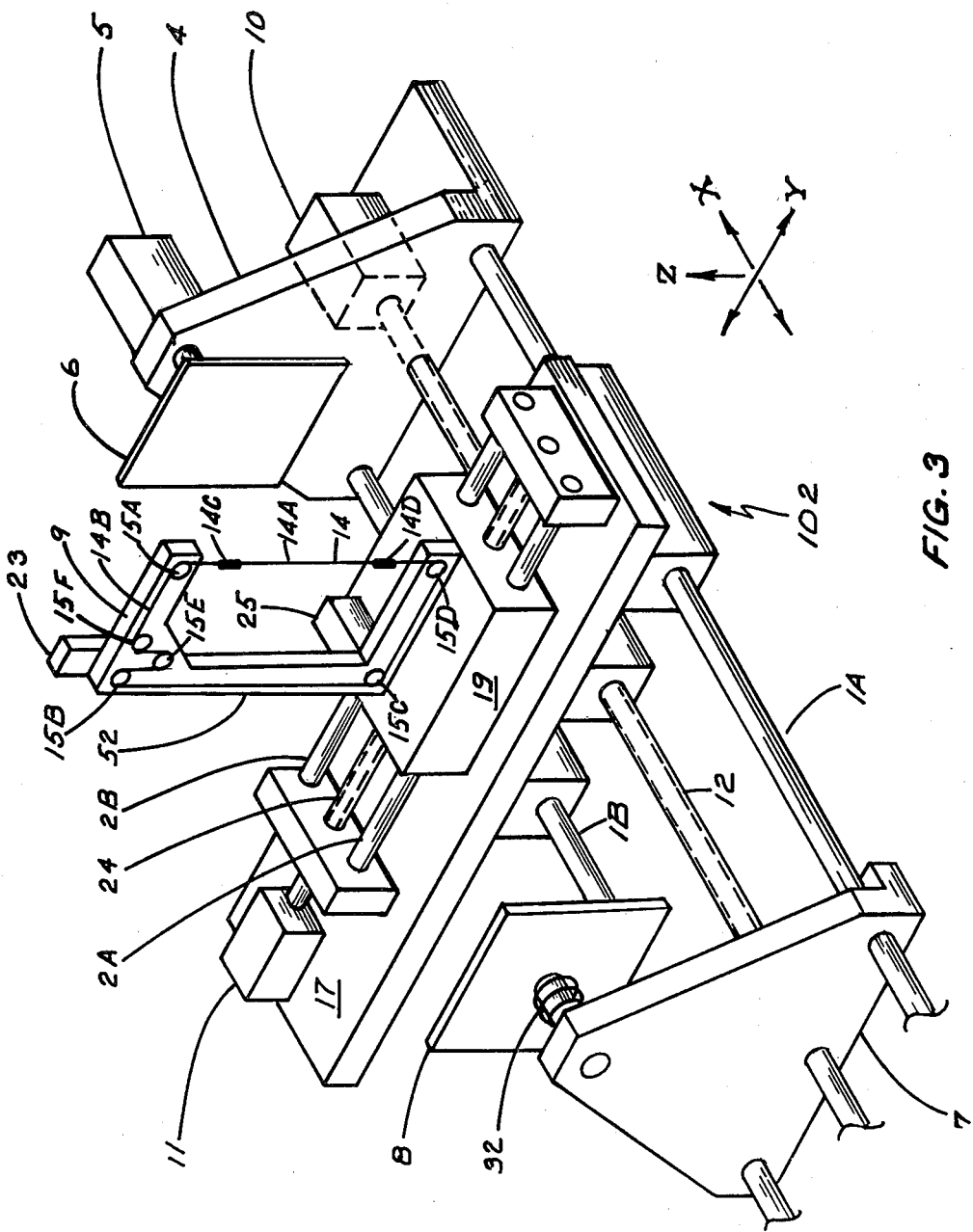

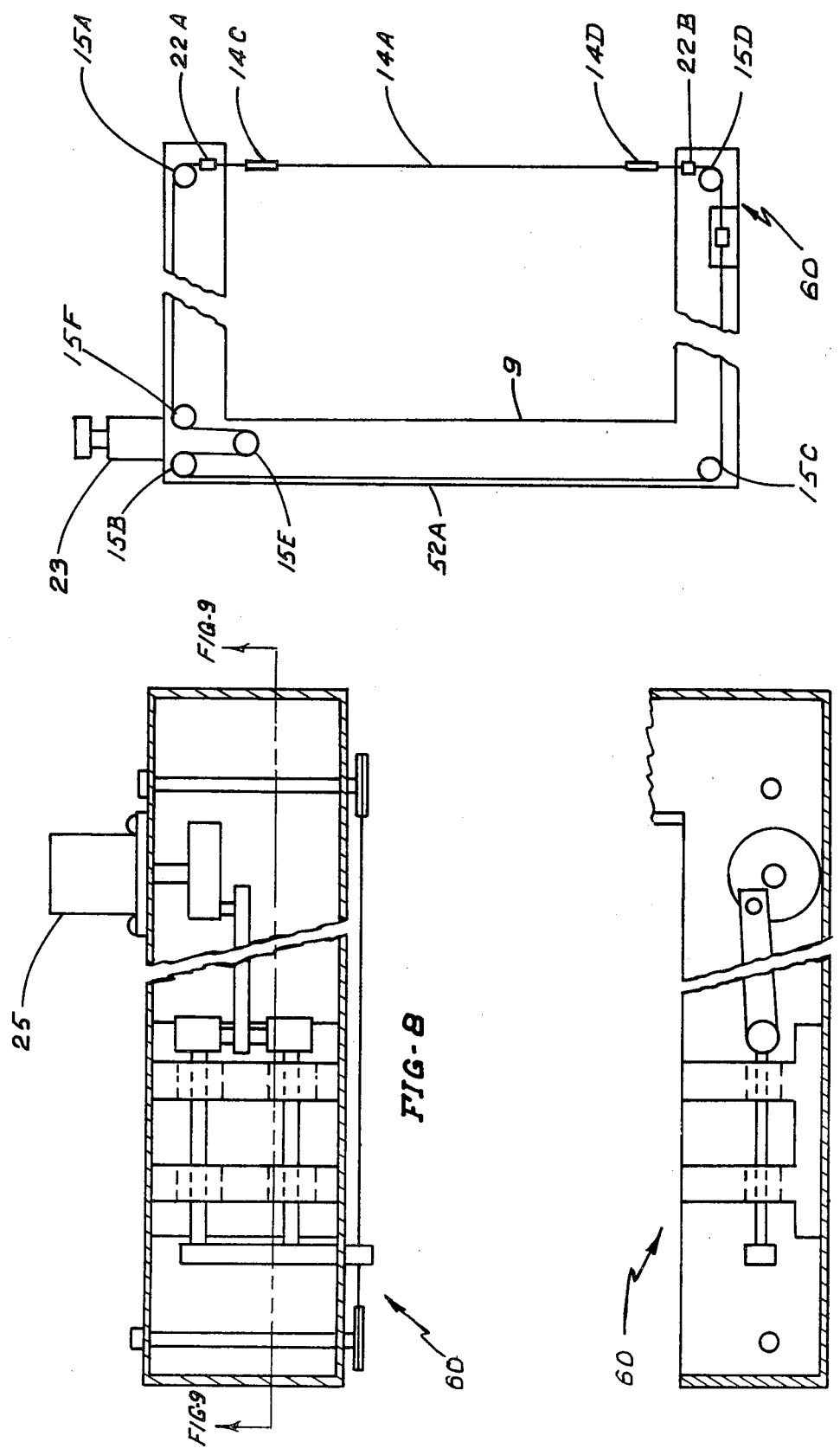

THREE-DIMENSIONAL MODEL-MAKING SYSTEM

BACKGROUND

The present invention relates to three-dimensional model-making systems.

By way of background, attention is called to an ASME paper entitled "Computer-Aided Design of Curved Surfaces with Automatic Model Generation" (Staley et al.) which was presented on Mar. 25, 1980; the author R. B. Jerard is the present inventor and the machine shown in FIG. 12 of the paper is the sole contribution of the present inventor, but the mathematics therein is not. See, also, "Sculpting via Computer Optics," American Machinist, September 1979, pp. 79–82; "Cutting with Wire: Laser Technology," Inc., Catalog No. 75–76. Attention is also called to U.S. Pat. Nos. 1,903,518; 2,144,370; 2,396,852; 2,599,920; 2,688,904; 2,831,476; 2,896,605; 3,153,355; 3,155,087; 3,208,127; 3,299,877; 3,508,457; 3,525,324; 3,755,701; 3,831,576; 3,866,052; 3,932,923; 4,016,856; 4,178,670.

Not included in the art just made of record is a substantial amount of art in which an engine lathe is used in combination with a rotary cutting tool mounted on the lathe head stock to permit x-y movement and the indexing of a workpiece for fluting or grooving of that workpiece.

The problem of visualizing and describing solid shapes in three dimensions is common to many fields of art and science and can be a major obstacle in the creative process. Architects, engineers, mathematicians, and artists are often faced with the necessity of picturing some space or surface which they have conceived and then communicating it to others, usually before an adequate representation of that surface exists. These persons might be engaged in work in any number of areas from fluid dynamics to architecture, from flow modeling to design or human engineering. Therefore, the need exists for some means to speed the representation of these shapes in order to introduce modeling directly to the creative process.

Traditionally, three-dimensional forms have been described by a series of drawings-two dimensional projections of the body on a set of orthogonal planes passing through it. These representations are insufficient for a number of reasons. First, the drawings do not represent complex shapes well since it is often difficult or impossible to show hidden features. Second, if all the details of a complex body were shown on a conventional sketch, the drawing would quickly become too cluttered to read. Third, two-dimensional representations of even simple objects are difficult to understand and often require long study by a practiced eye. Finally, drawings and sketches do not show the view how each projection of the body fits together. All of these drawbacks make it difficult for anyone to quickly and accurately describe an object in perspective based only on a set of drawings.

The design of three dimensional objects in a two dimensional medium has shaped products to a large extent. Many objects are designed a certain way simply because they can be drawn in plane views conveniently. Any experienced designer who has ever had to deal with a geometrically complicated design will testify to the truth of this statement. This limitation imposes an artificial constraint on the design which can result in either a poor design or expensive experimental iteration.

The use of computer graphics has been widely used to help augment the designers visualization abilities. Most systems for computer-aided design or manufacturing involve an extensive package of interactive graphics routines to allow designers to "speak" with it. This is usually done through a CRT screen or digitizing tablet which enables the operator to modify the design easily. In addition, these graphics systems often contain a sophisticated set of subprograms to allow the image to move or rotate to reveal hidden lines and new perspectives. The technique can become invaluable in understanding and analyzing an overall design from a set of simple 2-D projections.

Despite the increased utility the designer is still working in essentially a two dimensional medium. Visualization is aided by commercially available software routines which provide rotation, depth cueing, wiggle, and hidden line removal. In many cases these techniques may be more than adequate. However, a fast and convenient means of producing three dimensional models could often be a great aid.

Another important use of computer systems in industry is in computer aided manufacturing (CAM). These systems make use of the computer to guide a machine tool through a series of steps to produce some item or assembly. By combining this type of operation with a computer-aided design system, an integrated process is achieved with the potential to produce 3-D models quickly.

To produce a model using conventional numerical controlled (N/C) machining methods, the output of the designer is used by an N/C programmer to develop an APT (Automatic Programmed Tools) program for generating an N/C tape. This tape is then used to control a N/C machine tool to generate the model geometry defined by the APT program. The step involving the generation of N/C punched tape from an APT program is generally called post-processing. In the most general sense post-processing is taken to mean conversion of the mathematical description of a model geometry into control instructions for the machining of a three-dimensional object.

However, numerically controlled (NC) lathes and milling machines may be acceptable for the production area, but they are hardly fit for the design studio. Because of the materials and forces involved in these cutting processes, these machines are very large and heavy. In addition, the noise and debris produced by these machines make them unsuited to a creative environment. Finally, actual production-line equipment is very expensive and the cost of installing one of these to help the designer could probably not be justified. Another drawback associated with the NC approach is the extensive software required to determine the tool paths necessary to cut a given shape. For example, the software must take into account the diameter of the cutting tool and determine appropriate offsets. The designer requires a graphics system which is small and unobtrusive enough to be placed in his studio and which produces 3-D models from simple sketches and abstract shapes. To fit all of these requirements, a new generation of computer-controlled machines must be defined.

If the classical design cycle is contrasted with the design cycle suggested by the use of the present invention, there is a significant reduction in the number of steps, and therefore time, required to go from the initial rough sketch design to final model production. Since the designer sketches the design directly on the computer graphics screen and immediately constructs the mathematical model of the design geometry, it is not necessary for a draftsman to translate a sketch into a final detailed design drawing. Furthermore, since the output of the design session can be used without modification as input to the model generation facility, the N/C programmer is not required to generate an APT program from the detailed design drawings. This eliminates two often encountered sources of error in the classical design cycle: the interpretation of the design geometry into a sequence of machining operations, and the generation of an APT program to control a N/C machine tool.

It is a principal object of the present invention to provide a three-dimensional model-making system, one that permits facile translation of computer-designed shapes to three dimensional models.

Another object is to provide a system which is adapted to form such models from an easily-machinable material.

In order that a three-dimensional, model-making system form complex shapes in the time required by economics of the market place, and under computer control, it must be mobile and compact, it must cut rapidly but yet have a cutting mechanism with long life and that cutting mechanism must have sufficiently low inertia to permit rapid repositioning thereof. Still another object, therefore, is to provide a three-dimensional, model-making machine wherein the mechanical working parts of the machine are particularly well adapted to computer controls.

It is a further object to provide a way to free the designer from two dimensional design thinking with an easy and convenient mechanism for creating three dimensional physical models.

Another object of the invention is to develop a mechanical device which will easily interface with a computer graphics system to allow the designer to produce a three-dimensional model directly from a sketch, in his own studio.

Another object is to allow the designer to communicate shapes to others more easily than by drawings and to eliminate the costly and time-consuming process of hand-producing models.

A still further object is to generate models early in the design cycle thereby reducing the number of iterations required to produce a satisfactory design by exposing obvious errors during the initial phases of the design.

Still another objective is to move model creation from the shop into the design room, where it is visible and accessible to the designer.

It is another object of this work to create a 3-D model making machine that is inexpensive.

Another object is to create a machine easy to set up and simple enough to be operated by persons with no machining experience.

A further object is to present a machine that is compact and quiet enough to be used in the design room environment instead of the machine shop floor.

Another object is to permit creation of a 3-D model rapidly enough to allow its use in the preliminary design function.

Standard numerical control machines will produce models from computer generated tapes. But extensive post-processing of the part geometry must be done by NC languages such as APT. This complicated software slows the model making process and is a potential source of error. Therefore, it is still another object of this work to create a system simple enough to create models directly from the part geometry without extensive software.

Another objective of the device is to produce a system that is easily interfaced to a computer and that can be directly controlled by a large variety of digital computers. The machine should be configured as a computer peripheral.

These and still further objects are addressed hereafter.

SUMMARY OF THE INVENTION

The foregoing objects are achieved, generally, in a three-dimensional, model-making machine which employs a reciprocating wire with a cutting region to shape an easily-machinable material or the like into a desired form. The system further includes a mechanism to receive and secure the easily machinable material, the mechanism being operable to effect rotary positional orientation of the material. The wire is translationally movable in the x and y direction, reciprocating motion (e.g., one half to one inch movement) of the wire being in the z direction. The translational movement of the wire coupled with rotational indexing, permits contouring of the easily-machinable material to form complex three-dimensional shapes. In a system that includes the model-making machine, the x-y positions of the wire and the angular orientation of the material are determined by a computer; see the Staley et al paper. The wire is thin (0.010 inches or 0.025 cm.) to minimize the amount of material removed and to permit sharp contours, and the parts that move with the wire in translational motion have sufficiently low inertia to permit rapid re-positioning of the wire. In addition the wire has a long life.

Much of the prior art in U.S. Pat. Nos. 4,016,856; 3,155,087; 2,599,920; 1,903,701; 2,896,605; 3,299,877 teach various methods for cutting with wire. The primary applications in the past have been as a means to cut stone or very hard crystals such as those used for semiconductors. In general, the devices have been too bulky, complicated and heavy to meet the objectives of the present invention.

The invention is hereinafter described with reference to the accompanying drawing in which:

FIG. 3 is an isometric view of a preferred embodiment of the model making machine shown in block-form in FIG. 1, which machine includes a cutting wire to form a model from a workpiece (not shown in FIG. 3);

FIG. 7 is a side view of a frame used to hold the cutting wire in the machine of FIG. 3;

FIG. 8 is a top view of one form of drive mechanism that may be used to reciprocate the wire;

FIG. 9 is a view taken on the line 9—9 in FIG. 8 looking in the direction of the arrows.

Figure 1:
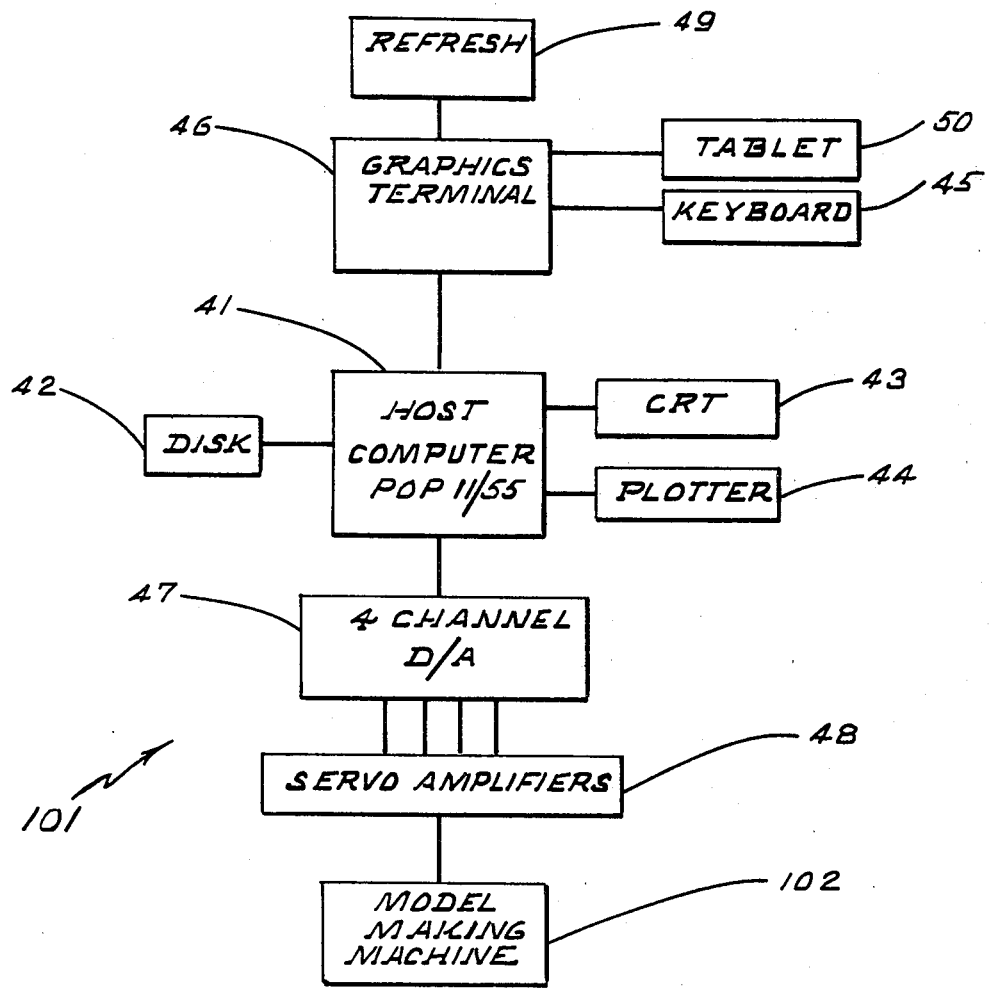
FIG. 1 is a diagrammatic representation of a three dimensional model making system employing the present model-making machine invention.

Turning now to FIG. 1, there is shown diagrammatically at 101 a three dimensional model making system adapted to form a model of predetermined shape from an easily machinable material. The system includes a host computer 41 which could be any of a general class of commercially available models. A PDP11/55 minicomputer made by Digital Equipment Corporation of Maynard, MA is indicated in the drawing. The PDP11/55 is shown with a typical array of peripherals including a disk 42, cathode ray tube (CRT) with keyset 43 and an x-y pen plotter 44. Connected to the PDP11/55 through a standard serial interface is a computer graphics terminal 46 of the type made by Imlach Corporation. The terminal 46 allows a designer to interactively create, modify and store design geometries. The Imlach console contains its own minicomputer with refresh CRT 49 and includes appropriate input-/output devices such as the keyboard 45 and tablet 50 shown in the diagram. The system as described to this point is similar to many computer aided design systems widely used in industrial and educational environments.

A distinguishing feature of the system 101 is the model making machine labeled 102 which is controlled directly by the host computer 41 through digital to analog converters (D/A) 47 which drive servo amplifiers 48 and hence the various axes of the model making machine 102. The model making machine 102 is shown in more detail in FIGS. 3,4,5, and 6. The servo amplifiers 48 and the D/A converter 47 are shown only generally and are meant to be indicative of one of a variety of ways the model making machine could be controlled by one skilled in the art.

Figure 2:
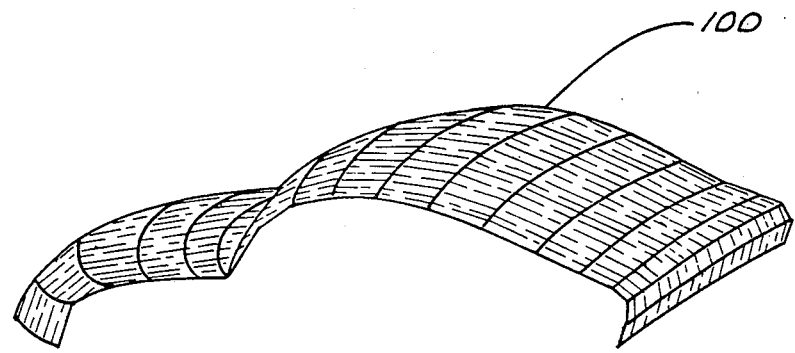
FIG. 2 is an example of a shape that was interactively designed on a computer graphics console.

In practice the designer would interactively create design geometries on the graphics console 46 in much the same way that an engineer, architect or industrial designer makes a pencil and paper sketch in the idea generation phase of the design process. Special purpose software is commercially available which would allow a designer to sketch a curved surface such as that shown at 100 in FIG. 2. The shape 100, which could be a car body, was sketched in a matter of minutes on a computer aided design system similar to the one shown in FIG. 1. With the addition of a model making machine such as will be described, the designer can then easily and quickly cut a model out of easily machinable material. The whole process from start to finish can easily be accomplished in less than one hour.

Figure 6:
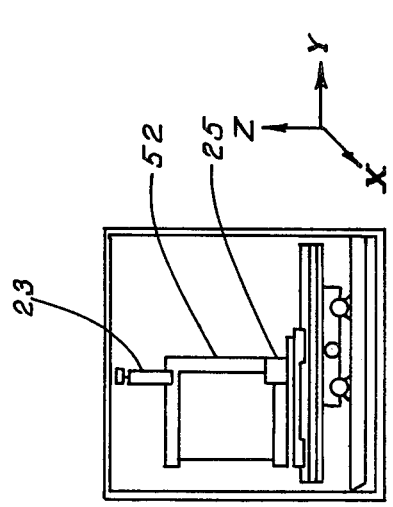
FIG. 6 is a side view of the model making machine of FIG. 4.
Figure 4:
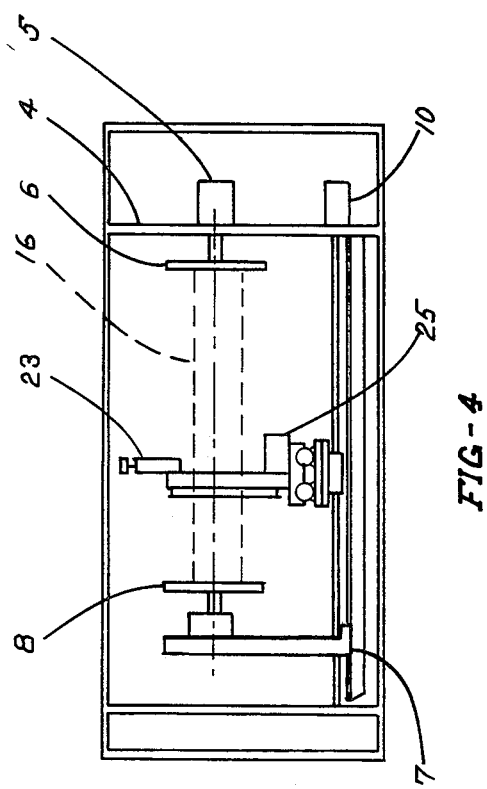
FIG. 4 is a front view of a slightly modified version of the model making machine in FIG 3.
Figure 5:
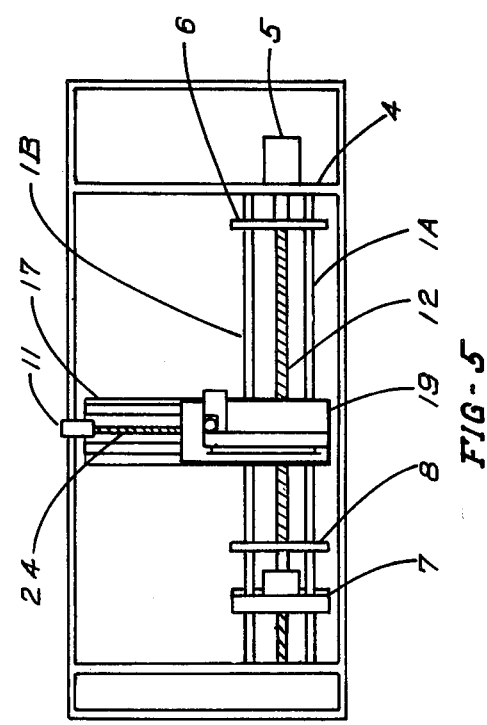
FIG. 5 is a top view of the model making machine in FIG. 4.

FIG. 3 is an isometric view of an embodiment of the model-making machine 102 of the present invention. FIGS. 4,5, and 6 show respectively the front, top and side views of a slightly modified version of the model maker 102. The model maker as shown in the figures, includes a wire 14 held in tension by a frame 9 in an assembly 52. The wire is a closed-loop wire which, for reasons discussed in greater detail later, consists of a somewhat brittle cutting portion 14A connected to a very flexible portion 14B. The brittle portion may be any of a variety of commercially available cutting wires such as those made by International Tool Specialties (Los Angeles, CA) or Laser Technology (No. Hollywood, CA). The frame 9 has pulleys 15A–15D in FIG. 3 at the four corners thereof and further pulleys 15E and 15F to receive the flexible portion 14B that is strung around the pulleys. Reciprocating forces are applied to the wire 14 by a reversing motor 25 (e.g., a DC motor with sinsusoidal voltage applied) coupled to the pulley 15C in FIG. 3; however, as later explained, the mechanism shown in detail in FIGS. 8 and 9 can be used. Tension is supplied by a spring within the chamber labeled 23 that acts through the pulley 15E (see FIG. 7).

The model maker or machine 102 is a three axis, computer controlled device that is used to machine three-dimensional models from rigid plastic foam, balsa wood and the like. The three axes of machine motion under control include two orthogonal linear axes (x and y in FIGS. 4 and 5) controlled by analog servomotors 10 and 11, and one rotational axis (later discussed) controlled by a digital stepper motor 5. Operation along the three axes may be controlled manually or directly by the host computer using means familiar to those skilled in servo system design.

The cutting mechanism of the model maker is the small-diameter wire 14 and, in particular, the cutting portion 14A thereof. The reciprocating forces are applied to the wire in the region of the flexible portion 14B. The flexible portion 14B, it has been found, is quite important for it permits the wire 14 to wrap around small diameter pulleys 15A . . . and still have a long fatigue life. This allows the machine 102 to have a compact geometry which is consistent with the environment for which it is intended. The wire 14 typically moves up and down (i.e., in the ±z-direction in FIG. 3) with an amplitude of about one inch to effect cutting of an easily-machinable foam material or workpiece 16 (shown in broken-like form in FIG. 4 only) which is held between spring-loaded rotatable turntables 6 and 8 in FIG. 3 that receive the foam material therebetween.

A most important facet of this invention is that the wire 14 have a small diameter (∼0.01 inch but not greater than about 0.1 inches), for that allows a user to generate contours sufficient for visualization without elaborate software. The system does not require a user to consider cutter offsets as do standard language systems such as APT.

The easily machinable material 16 may be any of a variety of rigid plastic foams. In practice phenolic foam of the type frequently used by florists has proven easy to cut and also generates very little dust. The foam is not particularly durable, but dipping the completed model into melted paraffin is one of a variety of secondary processes that can be employed to improved strength and surface finish.

The turntable 6 is indexed to achieve rotary indexing of the foam material; rotary forces are transmitted to the plate 8 through the workpiece, but the plates 6 and 8 can both be driven by coordinated stepper motors. A spring 32 holds the material in place during the cutting operation as is shown in more detail in FIG. 10. The turntables 6 and 8 are supported by vertical members 4 (headstock) and 7 (tailstock), respectively, that are secured to ways 1A and 1B. A carriage 17 moves translationally in the x direction, being driven by the servo motor 10 through a linear power screw 12; translational y-direction movement of the wire and frame is effected by the servomotor 11 through a linear power screw 24 which drives the carriage marked 19 that moves along ways 2A and 2B.

Figure 10:
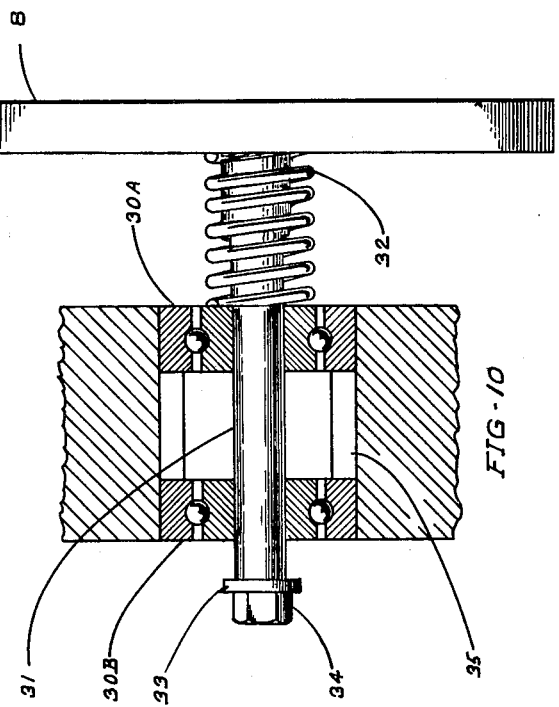
FIG. 10 is a front view, partially sectioned, of one form of spring loaded mechanism to hold the workpiece in place in the machine of FIG. 3.

The primary elements of the model making machine are the x-axis ways 1A and 1B and the y-axis ways 2A and 2B on which ride linear ball bearings within the carriages 17 and 19, respectively, of the type made by Thompson Industries in order to effect the desired x- and y-axes linear motion. Mounted on the x-axis ways 1A and 1B is the headstock 4 which holds the stepper motor 5 which drives the head rotary plate 6. The headstock 4 is stationary. Also mounted on the x-axis shaft is the positionable and clampable tailstock 7 which holds the tail rotary plate 8 that is spring loaded to hold the workpiece between the head and tail rotary plates. Details of the rotary tail plate 8 and associated parts are shown in FIG. 10. Mounted on the carriage 9 is the wire-support frame 9 which holds the wire 14 which reciprocates to effect cutting of the workpiece 16. The frame 9 is shown in more detail in FIG. 7. The x- and y-axis drive motors are shown driving linear feed screws of the type commonly found on machine tools. The motors may be any of a variety of types including either DC or AC servomotors with appropriate feedback means or stepper motors. The linear feed screws 12 and 24 impart the x- and y-axis longitudinal motion, respectively, to the cutting wire. Actual means of driving the x- and y-axes might include timing chains, or belts and pulley as alternate mechanisms to the screw shown. The servo position control system both moves and maintains position.

FIG. 7 is a side view of a frame assembly 52A which is a slightly modified version of the assembly 52 in FIG. 3. The assembly 52A consists of the frame 9 with the pulleys 15A . . . positioned so as to keep the cutting portion 14A of the wire 14 in the proper position. Mostly the frame assembly 52A differs from 52 in that it includes a kinematic linkage 60 for applying reciprocating motion to the wire 14 (see FIGS. 8 and 9). The cutting portion 14A is shown coupled by splice bushings 14C and 14D to the multi-stranded high fatigue life wire 14B which passes over the pulleys 15A . . .

The kinematic linkage 60 in FIGS. 8 and 9 is the well known slider crank mechanism which changes the rotary motion of a motor 25' to the reciprocating motion necessary to drive the wire. Either the previously discussed mechanism for applying reciprocating motion to the wire 14 or the kinematic mechanism is quiet during operation which is important for a design environment. The kinematic linkage has the salutary characteristic that it keeps the portion 14A in a central position between guides 22A and 22B without any other mechanism to serve that function. The guides 22A and 22B in FIG. 7 serve to center the cutting portion 14A of the wire and prevent cutting forces from acting on the pulleys 15A and 15D.

FIG. 10 is a side section view of one form of spring loaded mechanism that may be employed in the tailstock assembly to hold the workpiece (e.g., the workpiece 16 in FIG. 4) firmly between the headplate 6 and the tailplate 8. This mechanism allows the user to easily and quickly position the workpiece 16 in place and maintain the position during the cutting of the model. It also allows the user to make cuts completely through the workpiece without having the workpiece fall out of the machine. That is, the user can make cuts all the way through in the y direction and the spring force in the x direction will maintain the workpiece in position as if it were still all one piece. The spring loaded mechanism consists generally of a stepped shaft 31 on which is mounted in the tail rotary plate 8. The small diameter of the shaft 31 is inserted into a pair of bearings 30A and 30B mounted in the tailstock 7. A washer 33 and nut 34 secure the shaft in the bearings. The compression spring 32 maintains force on the workpiece. The label 35 designates a spacer to keep the bearings 30A and 30B apart; snap rings or plates may be used to counter horizontal forces as the shaft 31 moves to the left and right in FIG. 10.

In the forming operation, a complete x-y cut is made, the workpiece 16 is then incremented to a new angular position, a further x-y cut is made, and so forth, until the model is complete. The model maker typically operates at speeds of 0.05 to 0.50 inches/second, speeds that are set by the designer on a trial and error basis. Typical accuracy is between 0.01 and 0.06 inches.

The design and construction of an inexpensive model making machine, not based on N/C technology, and its integration into a computer aided design system as an easy to use peripheral device is the essence of the invention. The design of this machine permits the model generation phase of design development to be moved from the final to the initial stages of the design process. The ability to generate models early in the design cycle can reduce the number of iterations required to produce a satisfactory design by exposing obvious errors during the initial phases of design. This approach will move model creation from the shop or controlled environment areas into the design room where it is visible and accessible to the designer. Finally, the small amount of time required to generate a rough scale model of a design geometry created with the CAD system, allows the user to create models that serve as visualization aids during all stages of the 3-D design process.

Applications for the proposed invention are numerous. Since present day graphics systems provide only a two-dimensional representation, this model maker will have a great advantage in some areas. Architects will find it convenient to use the machine to produce simple modular shapes which can then be arranged into a full design. Engineers will be able to make inexpensive models of airfoils, ship hulls, automobiles, etc., for flow testing. The exact uses for this machine will depend on such factors as size, accuracy, surface finish, speed and cost.

Applications are likely to be found in the following areas:
1. Mechanical design;
2. Industrial design;
3. Architecture;
4. Ship hull design;
5. Generation of experimental models for fluid flow studies;
6. Masters for casting and injection mold processes;
7. Automotive styling;
8. Packaging problems;
9. Patterns for tracer lathes and mills.

Modifications of the invention herein disclosed will occur to persons skilled in the art and all such modifications are deemed to be within the scope of the invention as defined by the appended claims.

What is claimed is:

1. A three-dimensional model-making machine to form a model of predetermined shape from an easily machinable material, that comprises: a wire under tension; means for effecting translational positional changes in the wire in the x and y directions; means to receive said easily machinable material and operable to effect rotary indexing positional orientation of the material; and means to effect reciprocating motion of the wire perpendicular to the x and y directions to cut the material, the translational movement of the reciprocating wire coupled with the indexing serving to contour the easily-machinable material to form a complex three-dimensional shape.

2. A three-dimensional model-making machine as claimed in claim 1 that includes a frame that receives the wire and maintains the wire in tension.

3. A three-dimensional model-making machine as claimed in claim 2 wherein the frame is a C-shaped member having pulleys at the four corners of the C-shaped member to receive the wire.

4. A three-dimensional model-making machine as claimed in claim 5 having reversing means coupled to the wire to apply the reciprocating motion to the wire at said very flexible portion to effect cutting action.

5. A three-dimensional model-making machine as claimed in claim 3 in which the wire is a small-diameter composite comprising a brittle cutting portion connected to a very flexible portion, to provide a cutting mechanism, including the wire, that has long life, which flexible portion is strung around the pulleys.

6. A three-dimensional model-making machine as claimed in claim 1 in which said means to receive comprises a pair of rotary turntables that are adapted to receive the easily machinable material therebetween, means to provide rotational movement to at least one of the turn-tables, which rotational movement in an operating system is transmitted to the other turn-table by the easily machinable material, and means to spring load at least one of the turn-tables to maintain the easily machinable material therebetween.

7. A three-dimensional model-making system that includes a model-making machine as defined by claim 1 and that further includes a computer-aided design facility that comprises a host computer and peripheral devices.

8. A three-dimensional model-making system as claimed in claim 7 wherein said peripheral devices includes computer graphics design capability.

9. A system as claimed in claim 7 having servo-control means as interfaces between the computer-aided design facility and the model-making machine.

10. A three-dimensional model-making machine to form a model of predetermined shape from a material, that comprises: a small-diameter wire under tension, said wire comprising a brittle cutting portion and a very flexible portion; means for effecting translational positional changes of the wire in the x and y directions; means to effect about one-half to one inch reciprocating motion to said cutting portion in the z direction; and means to receive said material and operable to effect rotary, indexing positional orientation of the material about the x-axis.

11. A three-dimensional model-making machine as claimed in claim 10 in which the wire diameter is less than about 0.1 inches and in which said means to effect the reciprocating motion applies reciprocating drive forces to said flexible portion.

12. A three-dimensional compact model-making machine to form an object of predetermined shape from a material, that comprises: a cutting mechanisms that includes a small-diameter wire under tension comprising a brittle cutting portion and a flexible portion, and means to effect reciprocating motion of the brittle cutting portion by forces applied at said flexible portion to achieve long life, the cutting mechanism having sufficiently low intertia to permit rapid translational position changes thereof; means for effecting translational positional changes in the wire along two orthogonal linear axes to form said object by cutting action of the reciprocating cutting portion; and means to receive said material and operable to effect rotary positional indexing orientation of the material about a rotational axis that is parallel to one of the two linear axes to form a three-dimensional object of said predetermined shape by said cutting action.

13. A three-dimensional model-making machine as claimed in claim 12 in which the wire diameter is less than about 0.1 inches.

14. A machine as claimed in claim 12 in which the wire and parts that move therewith have relatively low inertia to permit rapid re-positioning thereof.

15. A machine as claimed in claim 12 in which the wire is closed loop, in which the flexible portion is a multi-strand wire, and in which the flexible portion is mechanically attached to the brittle cutting portion.

16. A three-dimensional model-making machine to form an object from a workpiece, which machine has three axes of motion that include two orthogonal linear axes and a rotational axis that corresponds in direction to one of the linear axes, that comprises:
 a cutting mechanism comprising a small-diameter wire having a brittle cutting portion and a flexible portion and means to effect reciprocating motion to the brittle cutting portion in a direction having a component orthogonal to the linear axes to cut into the workpiece as the brittle cutting portion is moved translationally along said two linear axes, said cutting portion having low inertia to permit rapid direction changes as the wire is moved translationally relative to the workpiece, forces to effect reciprocating motion being applied to the wire at the flexible portion to achieve, in combination with the brittle cutting portion, long life;
 means for moving the cutting portion along said two linear axes; and
 means to receive the workpiece and to provide indexing about the rotational axis to permit cutting to be achieved to provide a three-dimensional model.

17. A three-dimensional model-making machine according to claim 16 that includes means to apply said forces at the flexible portion.

18. A three-dimensional model-making machine according to claim 17 wherein the wire is closed loop and wherein the means to apply comprises an electric reversing motor coupled to the flexible portion.

19. A three-dimensional model-making machine according to claim 17 wherein the means to apply comprises a kinematic linkage coupled to the flexible portion to apply said forces, the kinematic linkage serving as well to maintain a proper cutting position of the brittle cutting portion.

20. A three-dimensional model-making machine according to claim 17 in which the means to receive the workpiece comprises a head plate and a tail plate which is part of a tailstock assembly which includes a spring to apply a force along the rotational axis to permit easy and quick positioning of the workpiece and to maintain the position thereof during the cutting action.

21. A system that includes the model-making machine of claim 17 and that further includes a computer-aided design facility connected to control the machine to permit facile translation of computer-designed shapes to complex three-dimensional models.

22. A system according to claim 21 in which the computer-aided design facility comprises a host computer and peripheral devices that includes computer graphics design capability.

23. A system according to claim 22 having servo-control means as interfaces between the computer-aided design facility and the three-dimensional model-making machine.

24. A three-dimensional model-making machine as defined by claim 17 that includes means to apply reciprocating forces to the flexible portion of the wire to effect reciprocating motion thereof of about one-half to one inch to achieve cutting action by said brittle cutting portion to contour the workpiece to form said object.

25. A three-dimensional model-making machine for forming a model of predetermined shape from a machinable material, comprising:
 (a) means for clamping the machinable material in a stationary position in relation to x and y directions;
 (b) means operatively connected to said clamping means to effect rotary indexing positional orientation of said material and enable said material to move rotationally about its longitudinal axis;
 (c) a wire under tension;
 (d) means for reciprocating the wire in cutting engagement with said material; and
 (e) means for moving the wire in x and y directions to effect shaping of the material when said wire engages said material.

26. A method of forming a three dimensional model of predetermined shape from a machinable material with a cutting wire under tension, comprising the steps of:
 (a) mounting said material for selective rotational indexing movement about its longitudinal axis during cutting engagement with said wire;
 (b) reciprocating the wire to effect cutting engagement with said material; and
 (c) guiding the wire in cutting engagement with the material in selectively x and y directions to effect shaping of said material.

27. The method of claim 26, wherein said material is mounted in stationary position relative to x and y directions.

28. The method of claim 26, wherein said wire reciprocates in short strokes in relation to its length during cutting engagement with said material.

29. The method of claim 28, wherein each short reciprocating stroke is approximately one-half to one inch.

* * * * *